United States Patent
Shin et al.

(10) Patent No.: US 10,972,708 B2
(45) Date of Patent: Apr. 6, 2021

(54) METHOD AND APPARATUS FOR COMPENSATING FOR COLOR SEPARATION OF IMAGE IN A LASER PROJECTOR-BASED HOLOGRAPHIC HEAD-UP 3 DISPLAY

(71) Applicant: HYUNDAI MOBIS Co., Ltd., Seoul (KR)

(72) Inventors: Min Ho Shin, Yongin-si (KR); Chan Young Yoon, Gwangmyeong-si (KR); Ji Yun Lim, Hwaseong-si (KR); Youn A Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 16/928,976

(22) Filed: Jul. 14, 2020

(65) Prior Publication Data

US 2021/0021792 A1 Jan. 21, 2021

(30) Foreign Application Priority Data

Jul. 16, 2019 (KR) .......................... 10-2019-0085942

(51) Int. Cl.
*H04N 9/31* (2006.01)
*H04N 9/30* (2006.01)
*H04N 17/02* (2006.01)

(52) U.S. Cl.
CPC ............. *H04N 9/3182* (2013.01); *H04N 9/30* (2013.01); *H04N 9/3161* (2013.01); *H04N 9/3194* (2013.01); *H04N 17/02* (2013.01)

(58) Field of Classification Search
CPC .. H04N 9/3129; H04N 9/3194; H04N 9/3135; H04N 9/3161; H04N 9/3182; H04N 9/30; H04N 9/31; H04N 17/02; H04N 17/00; H04N 17/04; H04N 9/3108; H04N 9/3105; H04N 9/3155
USPC ................ 348/189, 115, 739, 744, 750–757, 348/759–771; 345/7, 8, 207
See application file for complete search history.

(56) References Cited

U.S. PATENT DOCUMENTS

| 7,234,813 B2* | 6/2007 | Watanabe | G02B 26/06 348/750 |
| 2014/0049757 A1* | 2/2014 | Naitou | G03B 21/2053 353/86 |
| 2015/0022568 A1* | 1/2015 | Ishii | H04N 9/3194 345/697 |

* cited by examiner

*Primary Examiner* — Sherrie Hsia
(74) *Attorney, Agent, or Firm* — H.C. Park & Associates, PLC

(57) ABSTRACT

An apparatus and method for compensating for color separation of an image in a holographic head-up display (HUD), caused by a change in characteristics such as a temperature or wavelength of a laser projector. An apparatus (200) for compensating for color separation of an image in a HUD includes a GPU (100); a video signal inputter (110); a temperature sensor (120); a controller (130); a memory (135); a panel driving unit (140) for outputting an image to a panel (160); a laser diode driving unit (150) for driving R, G, and B laser diodes (151), (152), and (153); a lens (70), and a screen (180). Accordingly, an image, the quality of which is degraded due to color separation of an image, may be improved.

8 Claims, 7 Drawing Sheets
(3 of 7 Drawing Sheet(s) Filed in Color)

INPUT IMAGE FOR LASER PROJECTOR  OUTPUT IMAGE FOR HOE SCREEN

[INPUT IMAGE FOR LASER PROJECTOR]

SEPARATION OF R IMAGE        SEPARATION OF G IMAGE        SEPARATION OF B IMAGE

IMAGE POSITION CHANGED ACCORDING TO COLOR TEMPEATURE

COMBINED & RESULTANT IMAGE

| TEMP. DIFFERENCE | POSITION OF IMAGE (mm) | | |
| (CURRENT TEMP.-REF. TEMP.) | Red | Green | Blue |
|---|---|---|---|
| ... | ... | ... | ... |
| +1.5° | +0.9mm | +1.2mm | +1.1mm |
| +1° | +0.6mm | +0.8mm | +0.73mm |
| +0.5° | +0.3mm | +0.4mm | +0.37mm |
| 0° | 0 | 0 | 0 |
| -0.5° | -0.9mm | -1.2mm | -0.37mm |
| -1° | -0.6mm | -0.8mm | -0.73mm |
| -1.5° | -0.3mm | -0.4mm | -1.1mm |
| ... | ... | ... | ... |

| WAVELENGTH DIFFERENCE (CURRENT WAVELENGTH- REFERENCE WAVELENGTH) | POSITION OF IMAGE (mm) | | |
|---|---|---|---|
| | Red | Green | Blue |
| ... | ... | ... | ... |
| +1.5mm | +0.9mm | +1.2mm | +1.1mm |
| +1mm | +0.6mm | +0.8mm | +0.73mm |
| +0.5nm | +0.3mm | +0.4mm | +0.37mm |
| 0mm | 0 | 0 | 0 |
| −0.5mm | −0.9mm | −1.2mm | −0.37mm |
| −1mm | −0.6mm | −0.8mm | −0.73mm |
| −1.5mm | −0.3mm | −0.4mm | −1.1mm |
| ... | ... | ... | ... |

METHOD AND APPARATUS FOR COMPENSATING FOR COLOR SEPARATION OF IMAGE IN A LASER PROJECTOR-BASED HOLOGRAPHIC HEAD-UP 3 DISPLAY

CROSS-REFERENCE TO RELATED APPLICATION

This application claims priority to and the benefit of Korean Patent Application No. 10-2019-0085942, filed on Jul. 16, 2019, the disclosure of which is incorporated herein by reference in its entirety.

BACKGROUND

Field of the Invention

The present disclosure relates to a holographic head-up display (HUD) using a laser projector. More specifically, the present disclosure relates to an apparatus and method for compensating for color separation of an image in a laser projector-based holographic HUD, caused by a change of characteristics such as temperature and a wavelength of a laser diode.

Discussion of Related Art

Holographic head-up display (HUD) technology of the related art to which a holographic optical element (HOE) is applied uses light diffraction characteristics and has an advantage of reducing the volume of a product compared to when a geometric optical element such as a mirror or a lens is used.

In the holographic HUD technology of the related art, the HOE is a device sensitive to the wavelength of light and thus a laser, which is a light source corresponding to the HOE, is mainly used. The holographic HUD technology includes a method of using an HOE as a screen and a method of using a HOE as a light guide. According to both of the methods, the size of a product can be reduced compared to that of an existing HUD (according to a method using only a geometric optical system).

However, the HOE is a diffractive optical element which is sensitive to the wavelength of incident light, and thus, even when a path of incident light is the same, an angle of diffraction varies according to the wavelength of the light. Therefore, an image appears to be moving when viewed from a position of a driver. In addition, the amounts of change of wavelengths of red (R), green (G), and blue (B) lasers are different even when the temperature change is the same. Accordingly, an angle of diffraction in the HOE changes and thus color separation of an image occurs.

FIG. 1 is a diagram illustrating an example of color separation of an image occurring in a conventional laser projector-based holographic HUD using R and G laser diodes. R and G mages are displayed to coincide with each other, in a left input image (an image output from a laser projector), thus not causing color separation, whereas in a right output image (an image projected onto a HOE screen), an R image is displayed to be partially seen from the bottom of a G image, thus causing color separation.

SUMMARY OF THE INVENTION

Accordingly, the present disclosure is directed to improving color separation of an image due to a change of a characteristic, such as a change of temperature or a wavelength, which may occur in a holographic head-up display (HUD) using a laser light source.

According to an embodiment of the present disclosure, an apparatus for compensating for color separation of an image in an HUD includes a memory storing a table of correction values for an amount of movement of an image with relation to a change of characteristics, such as a temperature or a wavelength, of the laser diode; a temperature sensor or a wavelength measuring sensor configured to monitor the change of the characteristics of the laser diode; a means configured to determine a correction value for an amount of movement of an image with relation to the change of the characteristics of the laser diode, which is monitored by the temperature sensor or the wavelength measuring sensor, on the basis of the table; and a means configured to divide image information to be output to the HUD into a red (R) image, a green (G) image, and a blue (B) image, change positions of the R, G, and B images according to the determined correction value, and combine the resultant R, G, and B images.

According to another embodiment of the present disclosure, a method of compensating for color separation of an image in a head-up display (HUD) includes monitoring a change of characteristics of the laser diode; determining a correction value for an amount of movement of an image with relation to the monitored change of the characteristics of the laser diode on the basis of a table containing correction values for an amount of movement of an image with relation to the change of the characteristics, such as a temperature or a wavelength, of the laser diode; and dividing image information to be output to the HUD into R image, G image, and B image, changing positions of the R, G, and B images according to the determined correction value, and combining the resultant R, G, and B images.

The configuration and operations of the present disclosure described above will become apparent from embodiments to be described in detail below with reference to the drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
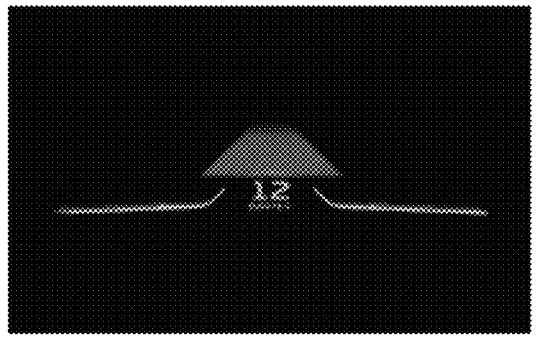
FIG. 1 is a diagram illustrating an example of color separation of an image that is caused by a temperature change in red (R) and green (G) laser diodes of the related art.
Figure 1:
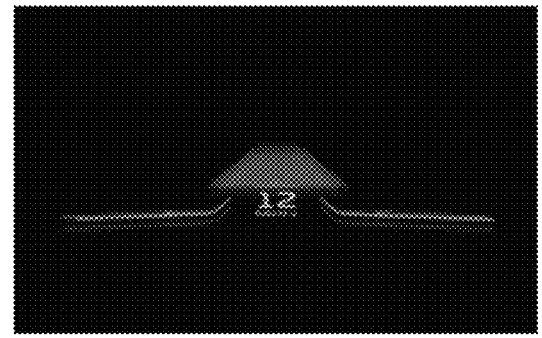

Advantages and features of the present disclosure and methods for achieving them will be apparent from embodiments described in detail below with reference to the accompanying drawings. However, the present disclosure is not limited to embodiments set forth herein and may be embodied in many different forms. Rather, these embodiments are provided so that this disclosure will be thorough and complete and will fully convey the scope of the present disclosure to those of ordinary skill in the technical field to which the present disclosure pertains. The present disclosure should be defined by the claims.

Terms used herein are for the purpose of describing embodiments and are not intended to limit the present disclosure. As used herein, the singular forms include the plural forms as well unless the context clearly indicates otherwise. The term "comprise" or "comprising", when used herein, does not preclude the presence or addition of one or more other elements, steps, operations, and/or devices other than stated elements, steps, operations, and/or devices.

Hereinafter, embodiments of the present disclosure will be described in detail with reference to the accompanying drawings. When reference numerals are assigned to elements of each drawing, the same reference numerals are assigned to the same elements if possible even when the elements are shown in different drawings. Furthermore, in describing the present disclosure, a detailed description of well-known functions or constructions related thereto is omitted when it is determined that they would obscure the gist of the present disclosure.

Figure 2:
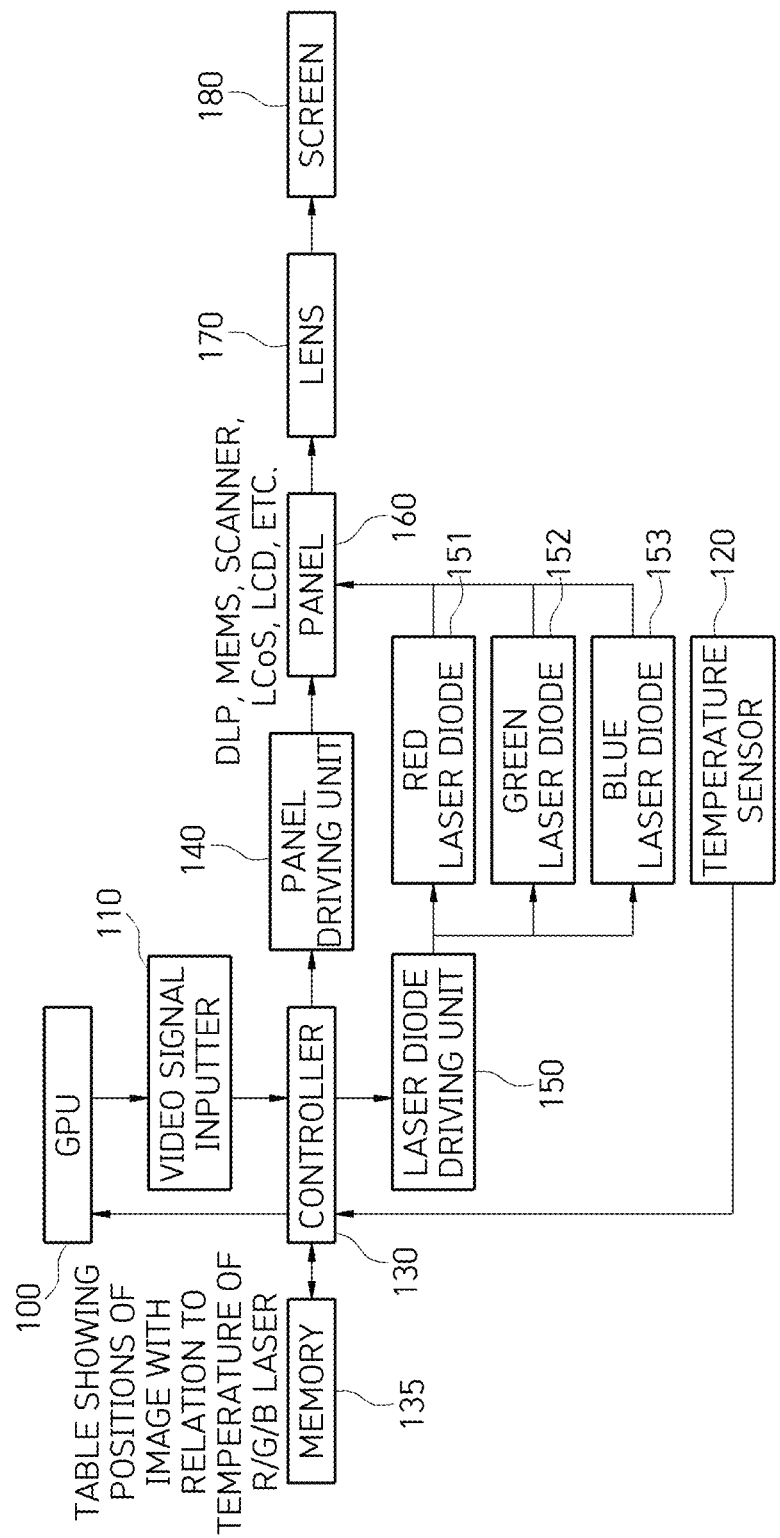
FIG. 2 is a conceptual configuration diagram of an apparatus for compensating for color separation of an image in a holographic head-up display (HUD) according to an embodiment of the present disclosure.

FIG. 2 is a block diagram of an apparatus 200 for compensating for color separation of an image in a holographic head-up display (HUD) according to an embodiment of the present disclosure. This embodiment is related to compensating for color separation that is caused by a change in temperature among characteristics of a laser diode of a holographic HUD.

A configuration of an apparatus for compensating for color separation of an image in a holographic HUD will be described with reference to FIG. 2 below.

The apparatus 200 of the present embodiment basically includes a controller 130 for overall control of the apparatus 200, a graphics processing unit (GPU) 100, a panel driving unit 140, and a laser diode driving unit 150.

In more detail, the apparatus 200 of the present embodiment includes a memory 135 storing a correction value table showing the relationship between a temperature of each of red (R), green (G), and blue (B) laser diodes and the position of an image (or according to another embodiment, the relationship between a wavelength of each of the R, G, and B laser diodes and the position of the image); a temperature sensor 120 which continuously monitors the temperatures of R, G, and B laser diodes 151, 152, and 153 and transmits the monitored temperature information to the controller 130; the controller 130 which transmits information about the amount of movement of each of R, G and B images to the GPU 100 on the basis of the table stored in the memory 135 when the temperature information received from the temperature sensor 120 and a reference temperature are different from each other; the GPU 100 which divides an image into R, G, and B images, changes the positions of the R, G, and B images, and combines the resultant R, G, and B images; a video signal inputter 110 which receives a corrected image from the GPU 100 (i.e., an image obtained by changing the positions of the R, G, and B images and combining the resultant R, G, and B images) and transmits the corrected image to the controller 130 (the controller 130 also transmits the received corrected image to the panel driving unit 140 and the laser diode driving part 150); the panel driving unit 140 which receives the corrected image from the controller 130 and drives a panel 160; the laser diode (LD) driving unit 150 which receives the corrected image from the controller 130 and drives the R, G, and B laser diode 151, 152, and 153; the R, G, and B laser diode 151, 152, and 153 which output image signals to the panel 160; the panel 160 which receives an image obtained by compensating for the positions of the R, G and B images by the panel driving unit 140 and the laser diode driving unit 150 and displays the obtained image; a lens 170 necessary for projecting the image displayed on the panel 160 onto a screen 180; and the screen 180 which displays a final image, the position of which is compensated for.

Figure 3:
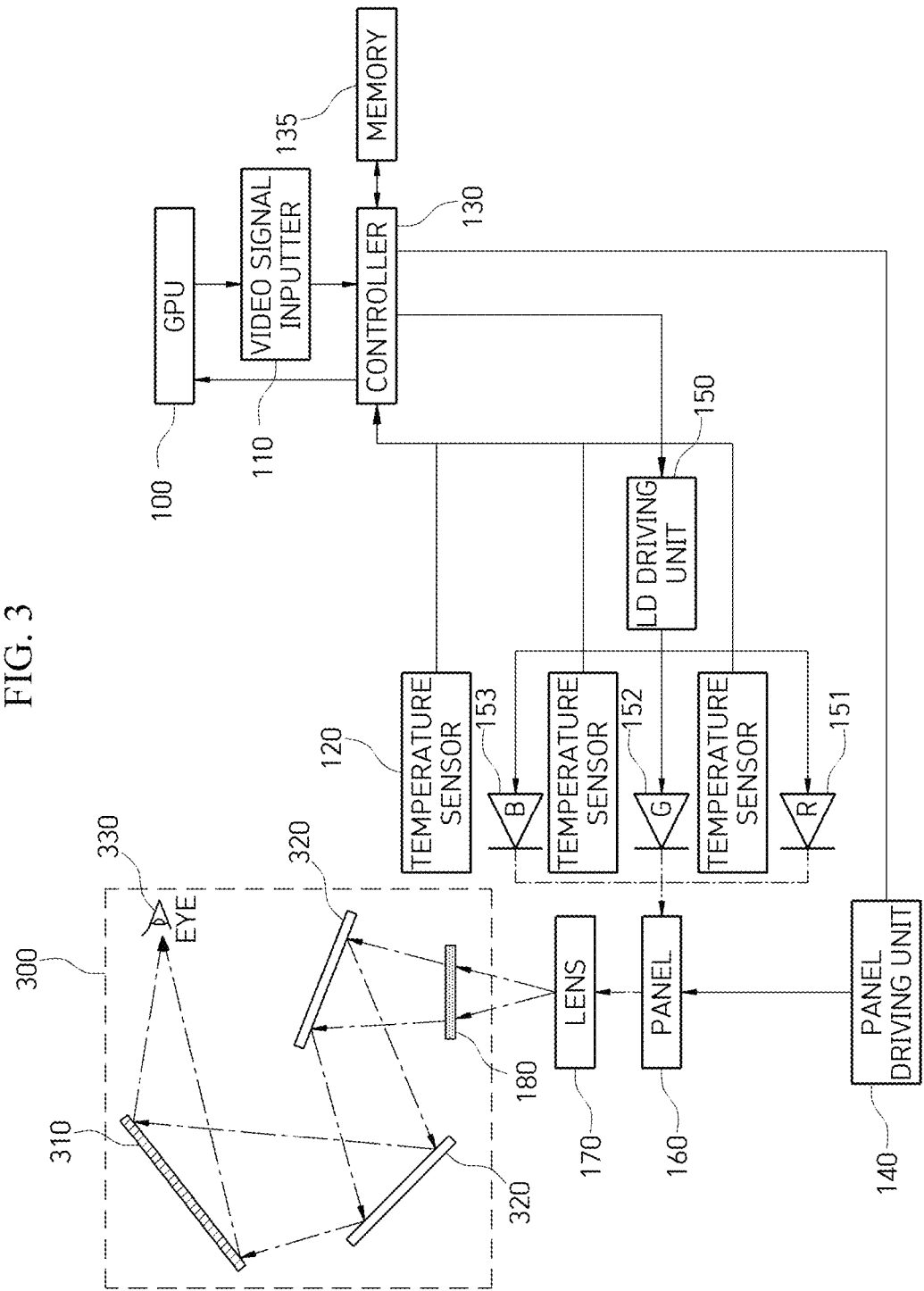
FIG. 3 is a detailed configuration diagram of an apparatus for compensating for color separation of an image in a holographic HUD according to an embodiment of the present disclosure.
Figure 4:
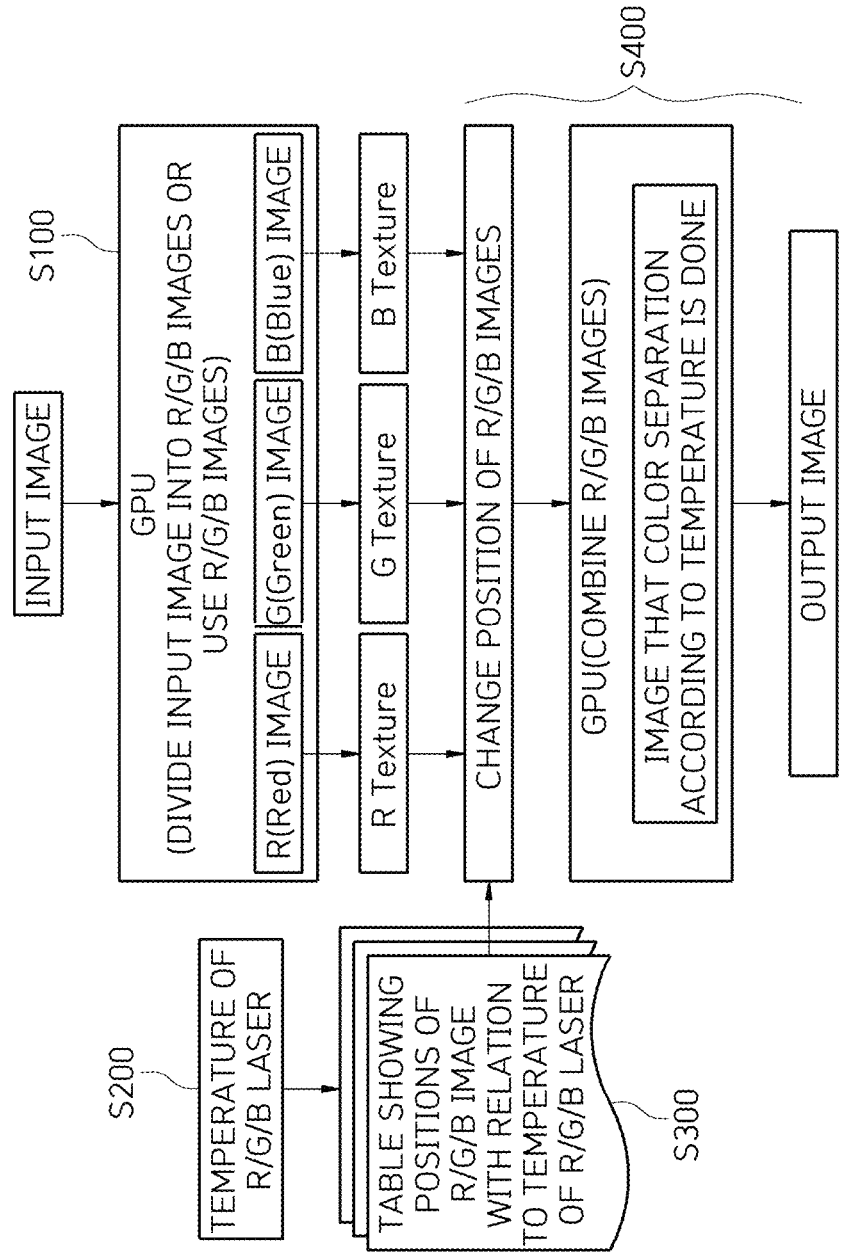
FIG. 4 is a flowchart of a method of compensating for color separation of an image in a holographic HUD according to an embodiment of the present disclosure.
Figure 5:
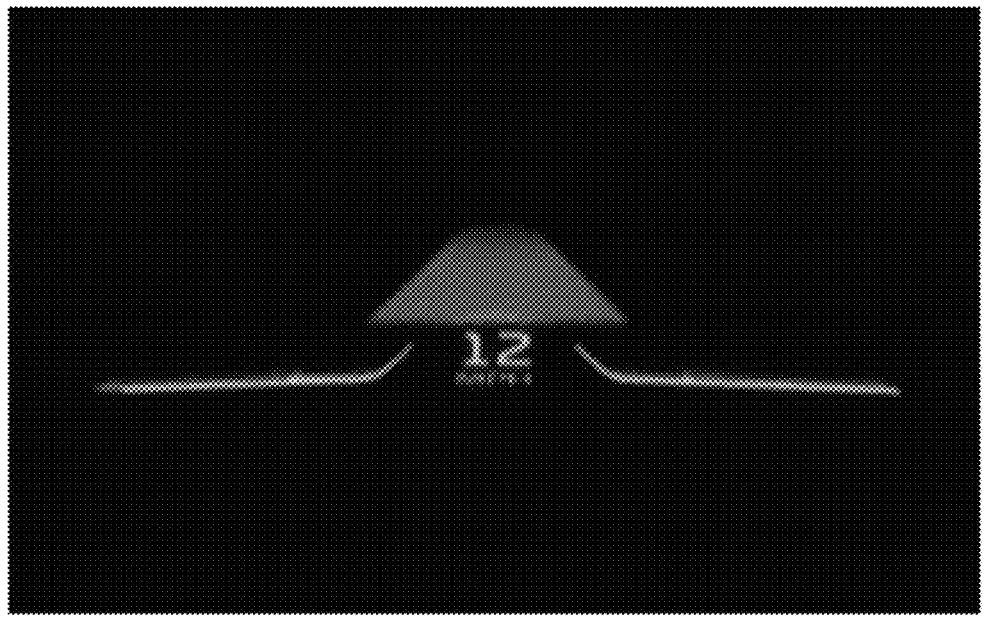
FIG. 5 illustrates an example of an input image illustrated in FIG. 4.

FIG. 3 illustrates in more detail the apparatus 200 of FIG. 2, in which a holographic HUD implementation unit 300 for projecting an image projected on the screen 180 onto a windshield (windscreen) of a car in a HUD manner is further illustrated.

First, the GPU 100 divides an image into R, G, and B images, changes the positions of the R, G and B images, and combines the resultant R, G and B images (i.e., to generate a corrected image).

At this time, in order to perform a process of correcting the image in the GPU 100, the temperature sensor 120 continuously monitors the temperatures of the R, G, and B laser diodes 151, 152, and 153 driven by the laser diode driving unit 150 and transmits temperature information of each of the R, G, and B laser diodes to the controller 130. The controller 130 receiving the temperature information of each of the R, G, and B laser diodes monitored by the temperature sensor 120 transmits information about the amount of change of the position of each of the R, G and B images to the GPU 100 on the basis of a correction value table (for example, see FIGS. 9 and 10) stored in the memory 135 when a temperature difference occurs when the temperature of each of the R, G, and B laser diode 151 to 153 is compared with a predetermined reference temperature. The GPU 100 receiving the amount of change of the position of each of the R, G, and B images from the controller 130 generates a final image (i.e., a corrected image) and transmits the corrected image to the video signal inputter 110. The video signal inputter 110 transmits an input signal (i.e., the corrected image received from the GPU 100) to the controller 130.

Based on the input signal (i.e., the corrected image) from the video signal inputter 110, the controller 130 transmits the input signal (i.e., the corrected image) to the panel driving unit 140 and the laser diode driving unit 150.

That is, the controller 130 controls the panel driving unit 140 which transmits an image to the panel 160 (e.g., a digital light projector (DLP), a micro-electro-mechanical systems (MEMS) scanner, Liquid Crystal on Silicon (LCoS), or a liquid-crystal display (LCD)) and the laser diode driving unit 150 which drives the R, G, B laser diodes 151, 152, and 153.

The R, G, and B laser diodes 151, 152, and 153 output corrected images to the panel 160. An image displayed on the panel 160 (an image obtained by compensating for the positions of R, G and B images) is projected onto the screen 180 through the lens 170. In this case, as illustrated in FIG. 3, the image displayed on the screen 180 may be implemented by a holographic HUD through a holographic optical element (HOE) integrated in a windscreen in the holographic HUD implementation unit 300. To this end, one or more mirrors 320 may be used when necessary. The mirror 320 may be in the form of a free-form surface, an aspherical surface, a spherical surface, a flat surface, or the like.

A final image (a holographic HUD image) in which color separation is improved through the apparatus 200 of the present embodiment described above can be viewed with an eye 330 of a human (a driver).

With reference to FIGS. 4 to 11 below, a color separation compensation method according to an embodiment of the present disclosure will be described in detail, focusing on a process of correcting an output image being performed by the GPU 100.

Figure 6:
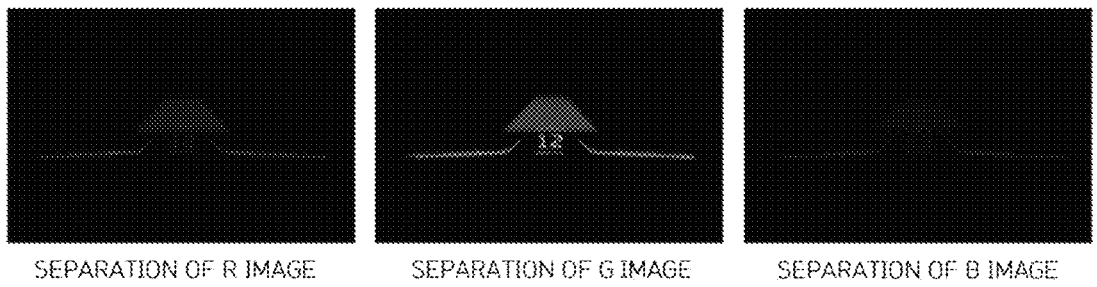
FIG. 6 illustrates an example of separation of R, G, and blue (B) images of FIG. 4.
Figure 7:
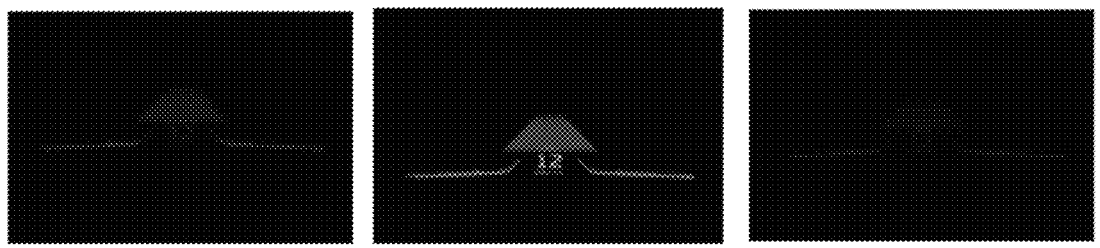
FIG. 7 illustrates an example of a change of positions of R, G, and B images according to a temperature.

S100: First, an image is input to the GPU 100. It is assumed that the input image is, for example, an image illustrated in FIG. 5. As illustrated in FIG. 6, the GPU 100 divides the input image (e.g., an image of FIG. 5) into R image, G image, and B image. According to the configurations of FIGS. 2 and 3, the R, G and B images are transmitted to the video signal inputter 110, and signals (i.e., the R, G, and B, images) of the video signal inputter 110 are transmitted to the controller 130.

S200: Operation S200 is performed by the controller 130 of FIGS. 2 and 3. The controller 130 receives information transmitted from the temperature sensor 120, the information being obtained by the temperature sensor 120 continuously monitoring a temperature change (or according to another embodiment, a wavelength change) in the R, G, and B laser diodes 151, 152, and 153 driven by the laser diode driving unit 150. Operation S300 is performed when a temperature difference occurs when a temperature of each of the R, G, and B laser diodes 151, 152, and 153 is compared with a predetermined reference temperature.

S300: When a result of comparing the temperature of each of the R, G, and B laser diodes 151, 152, and 153 with the predetermined reference temperature reveals that a temperature difference occurs, in operation S200, the controller 130 transmits information about the amount of change of the position of each of the R, G and G images to the GPU 100 on the basis of a table (for example, see FIG. 9) containing correction values for the amount of change of the position of an image with relation to a temperature change in R, G, and B lasers (or according to another embodiment, a table in FIG. 10 containing correction values for the amount of the position of an image with relation to a wavelength change in R, G, and B lasers), the table being stored in the memory 135.

S400: Upon receiving from the controller 130 the information about the amount of change of the position of each of the R, G, and B images, i.e., the amount of change of the position of each of the R, G and B images that is caused by a temperature change in the R, G, and B laser diodes 151, 152, and 153 detected by the temperature sensor 120 (or according to another embodiment, a wavelength change in the R, G, and B laser diodes 151, 152, and 153 detected by a wavelength sensor), the GPU 100 moves the R, G, and B images (for example, see FIG. 7). The GPU 100 combines the resultant R, G and G images and outputs a final image (a corrected image) (for example, see FIG. 8). In this case, the correction value, for the position of the image with relation to a temperature difference of the R, G and B lasers, and a direction of movement of the image may vary according to a system configuration.

As described above, according to FIGS. 2 and 3, the output image is transmitted to the controller 130 via the video signal inputter 110, finally displayed on the screen 180 as the panel driving unit 140 and the laser diode driving unit 150 are driven by the controller 130, and thereafter implemented by a holographic HUD by a HOE. As the corrected image obtained by changing the position of the image by the temperature change (or the wavelength change) is implemented by a holographic HUD, a driver is able to view an image in which color separation is compensated for.

The embodiment in which a main process of a method of compensating for color separation in a holographic HUD of the present disclosure is performed by the GPU 100 and the controller 130 has been described above. However, it will be apparent that a process of the present disclosure is not limited to being performed by hardware means separated by physical boundary (i.e., the GPU 100 and the controller 130).

Figures 8, 9:
FIG. 8 is an example of combination and output of the images of FIG. 4.
FIG. 9 is an example of a correction value table according to the relationship between temperature and a position of an image according to the present disclosure.

FIG. 9 illustrates an example of a correction value table used in the embodiments described above. Specifically, FIG. 9 illustrates a table containing correction values for the amount of change of a position of an image with relation to a temperature change in R, G, and B laser diodes.

First, light intensity, wavelengths, etc. of the R, G, and B laser diodes 151, 152, and 153 may vary according to an operating temperature, and may be correspond to characteristic values of components. The higher the intensity of a laser diode is, the higher an internal temperature of the laser diode is, thus changing an operating temperature. (When the operating temperature changes, a wavelength also changes.) When light emitted from the laser diode is diffracted by a HOE, an angle of diffraction of the light changes when a wavelength of the light changes, thus causing movement of an image. In this case, when there is a difference between wavelengths of light emitted from respective R, G and B laser diodes, color separation of the image occurs and thus in order to correct the color separation, the correction value table is prepared and stored in the memory 135 in advance. Correction values are calculated by taking into account the system (e.g., component characteristics, an optical system, a HOE, windshield characteristics of a car, etc.) or are obtained through experiments.

Figures 10, 11:
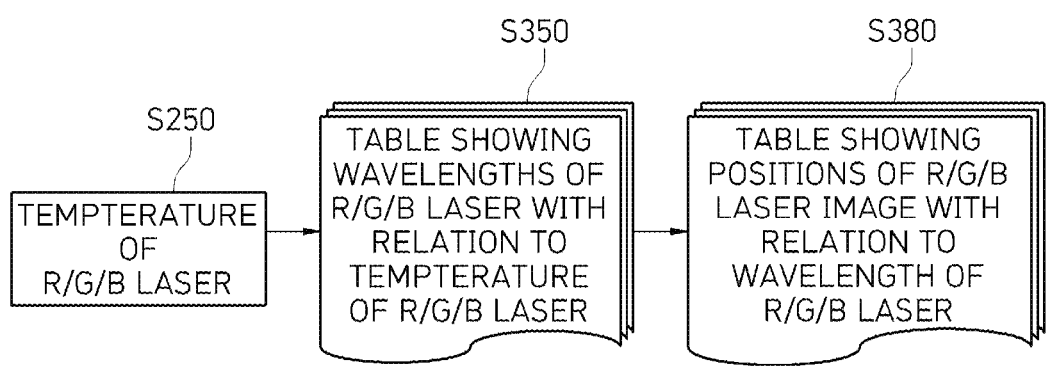
FIG. 10 is an exemplary diagram of a correction value table showing the relationship between a wavelength and a position of an image according to the present disclosure.
FIG. 11 is a conceptual diagram for explaining a method of compensating for color separation of an image in a holographic HUD according to another embodiment of the present disclosure.

As described above, in the above embodiments, a table (for example, see FIG. 9) showing the relationship between a temperature of a laser diode and the position of an image is used to determine the amount of change of the position of the image, but a wavelength change of the laser diode or the like may be used. For example, FIG. 10 illustrates a table containing correction values for the amount of change of a position of an image with relation to a wavelength change in R, G, and B laser diodes. The amount of change of the position of each of the R, G, and B images may be determined using the table and according to a wavelength change in the R, G, and B laser diodes detected by a wavelength measurer.

Alternatively, according to a modified embodiment illustrated in FIG. 11, a wavelength according to a temperature of a laser diode may be identified with reference to a table showing the relationship between a temperature of a laser diode and a wavelength (S350) while monitoring the temperature of the laser diode using the temperature sensor 120 as in the above embodiments without using a wavelength measurer or a wavelength sensor (S250), and a position of an image may be identified using a table showing a position of an image with relation to the determined wavelength (i.e., the table of FIG. 10) (S380). Accordingly, a wavelength measurer is not needed although a table showing the relationship between a temperature and a wavelength is additionally necessary.

According to the present disclosure, degradation of the quality of a HUD image, caused by color separation of an image occurring in a holographic HUD due to a change of characteristics such as a temperature and a wavelength of a laser projector (or a laser diode) can be improved.

In addition, according to the present disclosure, burden on a heat dissipation structure for temperature control of the laser projector in the holographic HUD can be reduced, thereby reducing the size, weight, and production costs of a device.

As described above, the present disclosure can be implemented in terms of a device or a method. In particular, a function of each component of and a process of the present disclosure can be implemented by at least one of a digital signal processor (DSP), a processor, a controller, an application-specific IC (ASIC), a programmable logic device (a field-programmable gate array (FPGA) or the like), and other electronic devices, and a hardware element including a combination thereof. Alternatively, the function of each component of and process of the present disclosure can be implemented by software alone or in combination with the hardware component element. The software can be stored in a recording medium.

While the present disclosure has been described above with reference to the embodiments thereof, it will be understood by those of ordinary skill in the art that the present disclosure may be embodied in many different forms without departing from the technical sprit or essential features of the present disclosure. Therefore, the embodiments set forth herein should be considered in a descriptive sense only and not for purposes of limitation. The scope of the present disclosure is defined not by the above description but by the following claims, and all changes or modifications derived from the scope of the claims and equivalents thereof should be construed as being included in the scope of the present disclosure.

What is claimed is:

1. An apparatus for compensating for color separation of an image in a head-up display (HUD) to process image information to be output through the HUD using a laser diode, the apparatus comprising:
   a memory configured to store a table of correction values for an amount of movement of an image with relation to a change of characteristics of the laser diode;
   a sensor configured to monitor the change of the characteristics of the laser diode;
   a unit configured to determine a correction value for an amount of movement of an image with relation to the change of the characteristics of the laser diode, which is monitored by the sensor, on the basis of the table; and
   a unit configured to divide image information to be output to the HUD into a red (R) image, a green (G) image and a blue (B) image, change positions of the R, G and B images according to the determined correction value, and combine the resultant R, G, and B images.

2. The apparatus of claim 1, wherein the change of the characteristics of the laser diode comprises a temperature change of the laser diode, and
   the sensor configured to monitor the change of the characteristics of the laser diode comprises a temperature sensor configured to measure a temperature of the laser diode.

3. The apparatus of claim 1, wherein the change of the characteristics of the laser diode comprises a wavelength change of the laser diode, and
   the sensor configured to monitor the change of the characteristics of the laser diode comprises a wavelength measurer configured to measure a wavelength of the laser diode.

4. An apparatus for compensating for color separation of an image in a head-up display (HUD) to process image information to be output through the HUD using a laser diode, the apparatus comprising:
   a memory configured to store a table showing a relationship between a temperature and a wavelength of the laser diode and a table containing correction values for an amount of movement of an image with relation to a wavelength change of the laser diode;
   a temperature sensor configured to monitor a temperature change of the laser diode;
   a unit configured to identify a wavelength change with relation to the temperature change of the laser diode monitored by the temperature sensor on the basis of the table showing the relationship between the temperature and the wavelength of the laser diode;
   a unit configured to determine a correction value for an amount of movement of an image with relation to the identified wavelength change on the basis of the table containing the correction values for the amount of movement of the image with relation to the wavelength change of the laser diode; and
   a unit configured to divide image information to be output to the HUD into a red (R) image, a green (G) image and a blue (B) image, change positions of the R, G and B images according to the determined correction value, and combine the resultant R, G, and B images.

5. A method of compensating for color separation of an image in a head-up display (HUD) to process image information to be output through the HUD using a laser diode, the method comprising:
   monitoring a change of characteristics of the laser diode;
   determining a correction value for an amount of movement of an image with relation to the monitored change of the characteristics of the laser diode on the basis of a table containing correction values for an amount of movement of an image with relation to the change of the characteristics of the laser diode; and
   dividing image information to be output to the HUD into a red (R) image, a green (G) image, and a blue (B) image, changing positions of the R, G, and B images according to the determined correction value, and combining the resultant R, G, and B images.

6. The method of claim 5, wherein the change of the characteristics of the laser diode comprises a temperature change of the laser diode, and the monitoring of the change of the characteristics of the laser diode comprises measuring a temperature of the laser diode.

7. The method of claim 5, wherein the change of the characteristics of the laser diode comprises a wavelength change of the laser diode, and the monitoring of the change of the characteristics of the laser diode comprises measuring a wavelength of the laser diode.

8. A method of compensating for color separation of an image in a head-up display (HUD) to process image information to be output through the HUD using a laser diode, the method comprising:

monitoring a temperature change of the laser diode;

identifying a wavelength change with relation to the monitored temperature change of the laser diode on the basis of a table showing a relationship between a temperature and a wavelength of the laser diode;

determining a correction value for an amount of movement of an image according to the identified wavelength change with relation to the temperature change of the laser diode on the basis of a table containing correction values for an amount of movement of an image with relation to the wavelength change of the laser diode; and dividing image information to be output to the HUD into a red (R) image, a green (G) image, and a blue (B) image, changing positions of the R, G, and B images according to the determined correction value, and combining the resultant R, G, and, B images.

* * * * *